United States Patent [19]

Klinkenberg

[11] Patent Number: 4,864,884

[45] Date of Patent: Sep. 12, 1989

[54] BALL NUT AND MEANS FOR ATTACHING A MOUNTING FLANGE THERETO

[75] Inventor: Hubert E. Klinkenberg, Rochester Hills, Mich.

[73] Assignee: Dana Corporation, Toledo, Ohio

[21] Appl. No.: 226,677

[22] Filed: Aug. 1, 1988

[51] Int. Cl.$^4$ ............................................. F16B 39/34
[52] U.S. Cl. .................................... 74/459; 411/226; 411/265
[58] Field of Search ................. 74/459; 411/223, 224, 411/226, 265, 266, 270

[56] References Cited

U.S. PATENT DOCUMENTS

| | | |
|---|---|---|
| 985,826 | 3/1911 | McLaughlin ................... 411/278 |
| 3,014,380 | 12/1961 | Martens ........................... 74/459 |
| 3,073,177 | 1/1963 | Grabowski ...................... 74/459 |
| 3,178,958 | 4/1965 | Beck ................................ 74/459 |
| 3,512,426 | 5/1970 | Dabringhaus .................. 74/459 |
| 3,572,414 | 3/1971 | Onufer ............................ 151/19 |
| 4,069,854 | 1/1978 | Heighberger ................... 151/31 |
| 4,564,993 | 1/1986 | Blaurock et al. ............... 29/434 |

FOREIGN PATENT DOCUMENTS

| | | | |
|---|---|---|---|
| 3502582 | 8/1986 | Fed. Rep. of Germany ........ 74/459 |
| 42680 | 7/1924 | Norway .............................. 411/223 |
| 138834 | 2/1920 | United Kingdom ................ 411/265 |

*Primary Examiner*—Leslie A. Braun
*Assistant Examiner*—Scott Anchell
*Attorney, Agent, or Firm*—Leydig, Voit & Mayer, Ltd.

[57] ABSTRACT

A ball nut having a ball return tube is formed with an externally threaded stud for supporting a mounting flange which is adapted to be screwed onto the stud. Angularly spaced segments of resiliently compressible wire are seated in an annular groove in one face of the flange. When the flange is screwed onto the stud, the segments engage a shoulder on the nut and compress to enable the flange to be tightened to a position in which the flange is in a predetermined angular orientation relative to the ball return tube.

7 Claims, 1 Drawing Sheet

U.S. Patent   Sep. 12, 1989   4,864,884
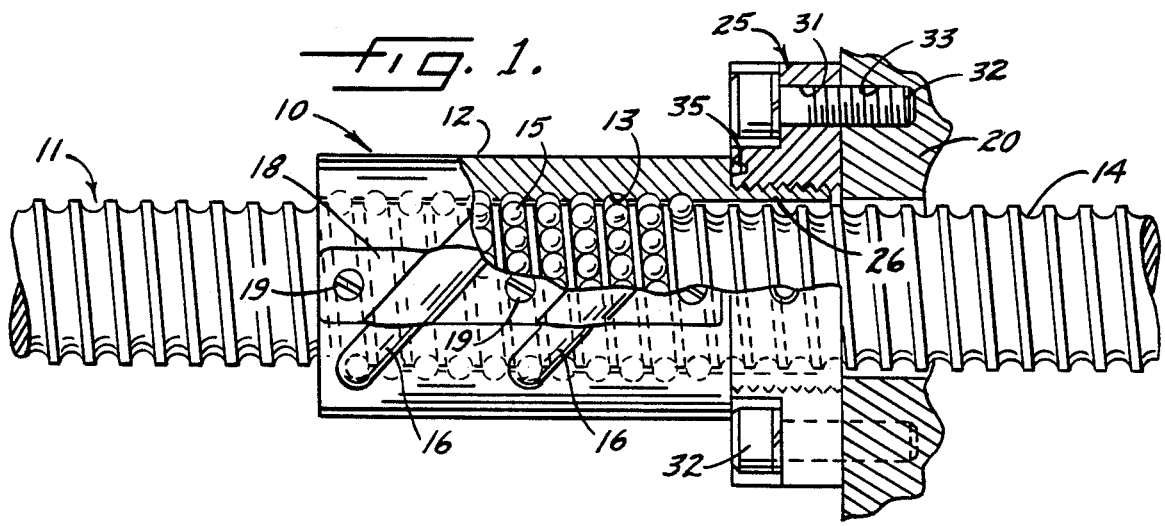
Fig. 1.
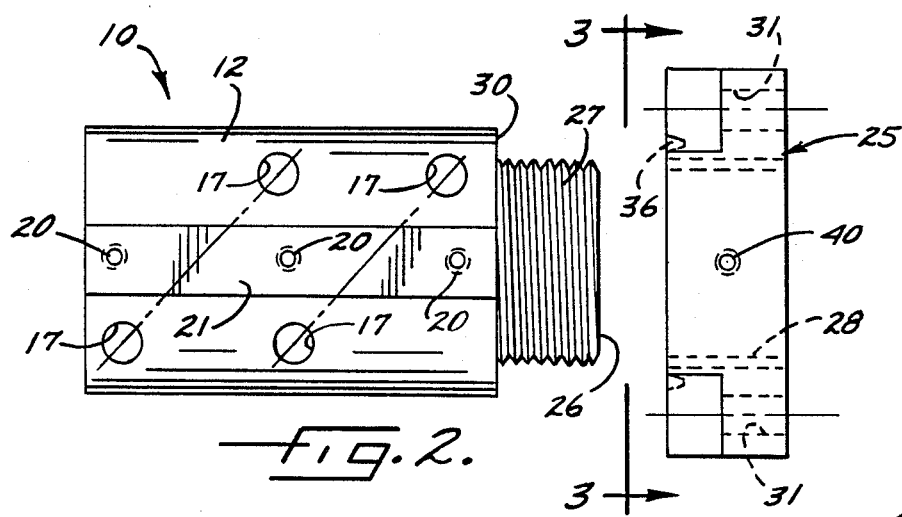
Fig. 2.
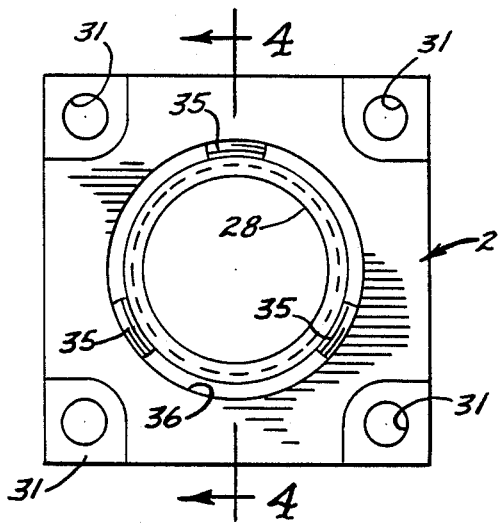
Fig. 3.
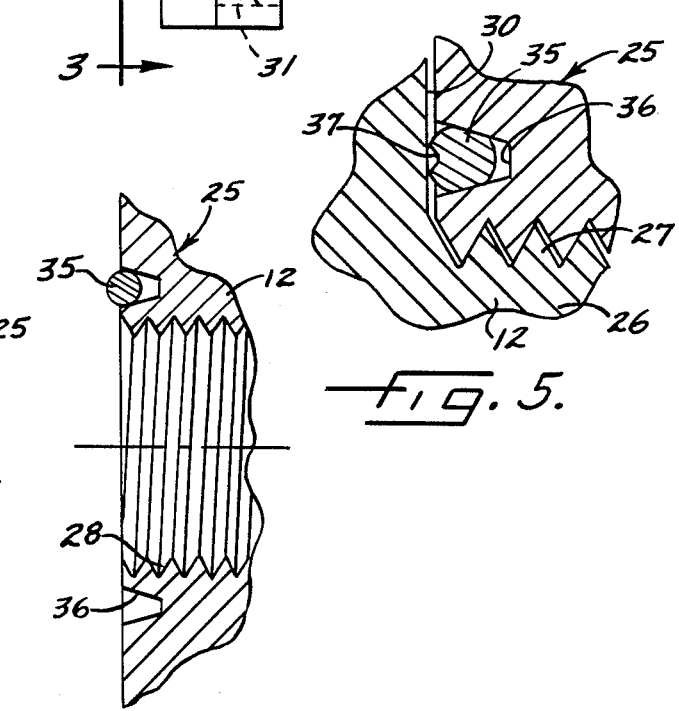
Fig. 4.
Fig. 5.

BALL NUT AND MEANS FOR ATTACHING A MOUNTING FLANGE THERETO

BACKGROUND OF THE INVENTION

This invention relates generally to a nut and more specifically to a ball nut of the type which is adapted to be coupled to a ball screw by a train of recirculating anti-friction balls. When the nut and the screw are turned relative to one another, the nut advances along the screw with low friction by virtue of the balls circulating between the threads of the nut and the screw. One or more return tubes located on the outer side of the nut permit the balls to continuously recirculate in a closed path.

In most instances, the screw is rotated and the nut is held in a rotationally stationary position. To prevent rotation of the nut, a mounting collar or flange is threadably coupled to the nut and is formed with holes for receiving fasteners which secure the nut to a machine element or the like adapted to be advanced by rotation of the screw.

It is desirable to establish a predetermined angular relationship between the nut and the mounting flange. For example, it may be desired to locate the holes in the mounting flange in predetermined angular position relative to the ball return tubes. With conventional ball nuts, this can be achieved only through the use of shims of selective thickness between the nut and the flange or by trial-and-error assembly, disassembly, machining and reassembly of the nut and the flange.

SUMMARY OF THE INVENTION

The general aim of the present invention is to provide a new and improved nut in which a predetermined angular relationship between the nut and the mounting flange may be established faster and easier than has been possible heretofore.

A more detailed object of the invention is to achieve the foregoing through the provision of resiliently compressible inserts between the nut and the mounting flange. When the flange is tightened on the nut, the inserts compress to permit such tightening while enabling the flange to be turned into a desired angular orientation relative to the nut.

Still another object of the invention is to use the compressible inserts to keep the mounting flange square on the nut.

These and other objects and advantages of the invention will become more apparent from the following detailed description when taken in conjunction with the accompanying drawings.

BRIEF DESCRIPTION OF THE DRAWINGS

FIG. 1 is a side elevational view of a ball screw equipped with a new and improved ball nut incorporating the unique features of the present invention, part of the nut being broken away and shown in section.

FIG. 2 is an exploded side elevational view of the ball nut and the mounting flange.

FIG. 3 is an end view of the mounting flange as taken along the line 3—3 of FIG. 2.

FIG. 4 is an enlarged fragmentary cross-section taken substantially along the line 4—4 of FIG. 3.

FIG. 5 is an enlarged view of certain parts shown in FIG. 4.

DETAILED DESCRIPTION OF THE PREFERRED EMBODIMENT

For purposes of illustration, the invention has been shown in the drawings in connection with a nut and specifically a ball nut 10 which is adapted to be advanced along a ball screw 11 when the latter is rotated. The ball nut includes a sleeve 12 whose bore is formed with a helical groove 13 which is of the same lead as a helical groove 14 formed in the screw 11.

In this particular instance, two trains of spherical balls 15 circulate within the grooves 13 and 14 when the screw 11 is rotated to advance the nut linearly along the screw. A return tube 16 is associated with each train of balls and serves to recirculate the balls from one end of the groove 13 in the nut 10 to the other end of the groove. It should be appreciated that the nut could utilize only a single train of balls and a single return tube.

Each return tube 16 is located on the outer side of the sleeve 12 and its end portions are telescoped into holes 17 (FIG. 2) formed in the sleeve. A clamping strap 18 (FIG. 1) extends across the return tubes and is secured to the sleeve 12 by means of screws 19 extending through the strap and threaded into tapped holes 20 (FIG. 2) in the sleeve. The end portions of the strap are received in a longitudinally extending groove 21 formed in the outer side of the sleeve.

The nut 10 is adapted to be secured to a member such as a machine tool carriage 20 which is adapted to be advanced when the screw 11 is rotated. For this purpose, the nut includes a mounting collar or flange 25 adapted to be secured to the sleeve 12 and fastened to the carriage 20. To couple the sleeve and the flange, a stud 26 with external threads 27 is formed integrally with and projects axially from the sleeve. The sleeve is formed with a central bore having internal threads 28 adapted to be screwed onto the threads of the stud. The outer diameter of the stud 26 is less than the outer diameter of the sleeve 12 and thus an axially facing and radially outwardly extending shoulder 30 (FIG. 2) is defined at the junction of the sleeve and the stud. When the mounting flange 25 is screwed onto the stud 26, one end of the flange is located closely adjacent the shoulder 30.

Herein, the mounting flange 25 is square in shape and its corners are formed with holes 31. Fasteners in the form of screws 32 (FIG. 1) extend through the holes and are threaded into tapped holes 33 in the carriage 20 in order to secure the flange to the carriage.

In certain cases, it is necessary that the holes 31 or other element on the square mounting flange 25 be located in a predetermined angular orientation with respect to an element on the sleeve 12 when the flange is tightened fully on the stud 26. By way of example, structure surrounding the ball screw 11 may dictate that the nut 10 be installed on the screw with the return tubes 16 located in a specific angular position. To achieve such an installation, it is necessary that the mounting flange 25 be located on the stud 26 in a predetermined angular orientation when the flange is fully tight.

According to the present invention, resiliently compressible means 35 are provided between the sleeve 12 and the flange 25 to enable the flange to be screwed tightly onto the stud 26 and still be located in an exact predetermined angular orientation relative to the sleeve. As a result, the need for trial-and-error machining and the use of shims of selective thickness may be completely avoided.

More specifically, the resiliently compressible means 35 are ring-like in nature and preferably are formed by three angularly spaced arcuate inserts or segments (see FIG. 3). Herein, each segment is formed from a piece of round wire which may be steel, copper, aluminum, plastic or other material capable of being resiliently compressed.

As shown most clearly in FIGS. 3 and 4, the three wire segments 35 are located in and are spaced around an annular groove 36 of generally V-shaped cross-section. Herein, the groove is formed in that end of the flange 25 disposed in face-to-face relation with the shoulder 30. The depth and shape of the groove are such that a portion of each wire segment projects axially beyond the end of the flange (see FIG. 4).

The wire segments 35 are captivated in the groove 36 so as to be held in assembled relation with the flange 25 until such time as the flange is screwed onto the stud 26. In the preferred embodiment, the segments are staked in place in the groove by striking the center of each segment at 37 with a round punch having a diameter equal approximately to that of the wire. Such punching causes a portion of each segment 35 to flow and be pressed tightly against the walls of the groove 37 so as to captivate the segment in the groove.

With the foregoing arrangement, the flange 25 is screwed onto the stud 26 until the segments 35 contact the shoulder 30. At this point, the flange starts to tighten on the stud. If the flange is not then in proper angular orientation with the sleeve 12, the flange may be turned further. During such turning, the segments 35 compress to prevent the flange from locking up on the stud. By virtue thereof, the flange may be turned through the angular distance necessary to establish the proper orientation. After the flange has been properly oriented, it may be pinned in place by driving a pin (not shown) through a hole 40 (FIG. 3) in the flange.

The segments 35 not only enable continued turning of the flange 25 after tightening but also help hold the flange in a square condition on the stud 26. By virtue of their resiliency, the compressed segments 35 urge the flange away from the shoulder 30. As a result, the right flanks of the thread 28 in the flange are loaded in continuous contact with the left flanks of the thread 27 on the stud 26. This provides alinement of the flange to the threads to permit close control of the flange squareness relative to the axis of the nut 10 without need of additional machining operations. In addition, such engagement of the threads helps keep the flange square to the nut during service use.

I claim:

1. A nut comprising a sleeve with an internally threaded bore for receiving a screw, a first element located in a predetermined angular position on said sleeve, a threaded stud rigid with and projecting from one end of said sleeve, the outer diameter of said stud being less than the outer diameter of said sleeve so as to cause an axially facing and radially outwardly extending shoulder to be defined at the junction of said sleeve and said stud, a mounting collar threadably connected to said stud and having an axially facing end disposed in face-to-face relation with said shoulder, a second element located in a predetermined angular position on said mounting collar, and angularly spaced and resiliently compressible inserts between said shoulder and said one end of said collar, said inserts compressing axially as said collar is tightened relative to said stud so as to permit said collar to be turned to a position establishing a predetermined angular relationship between said second element on said collar and said first element on said sleeve.

2. A nut as defined in claim 1 in which said stud is externally threaded, said mounting collar being internally threaded and being screwed onto said stud, said mounting collar having a groove receiving said compressible inserts.

3. A nut comprising a sleeve with an internally threaded bore for receiving a screw, a first element located in a predetermined angular position on said sleeve, an externally threaded stud rigid with and projecting from one end of said sleeve, the outer diameter of said stud being less than the outer diameter of said sleeve so as to cause an axially facing and radially outwardly extending shoulder to be defined at the junction of said sleeve and said stud, a mounting collar having an internally threaded bore receiving said stud and having an axially facing end disposed in face-to-face relation with said shoulder, a second element located in a predetermined angular position on said mounting collar, and resiliently compressible means on said one end of said collar and engageable with said shoulder when said collar is tightened on said stud, said means compressing axially during said tightening so as to permit said collar to be turned to a position establishing a predetermined angular relationship between said second element on said collar and said first element on said sleeve.

4. A nut as defined in claim 3 in which said resiliently compressible means comprise ring-like means, and an axially facing groove formed in said one end of said collar and snugly receiving said ring-like means.

5. A nut as defined in claim 4 in which said ring-like means comprise a series of angularly spaced and arcuate segments.

6. A nut as defined in claim 5 in which said segments are made from round wire.

7. A ball nut comprising a sleeve with an internally threaded bore for receiving a ball screw and a plurality of balls, angularly spaced and generally radially extending holes formed through said sleeve, a ball return tube attached to said sleeve and having end portions located in said holes, an externally threaded stud rigid with and projecting from one end of said sleeve, the outer diameter of said stud being less than the outer diameter of said sleeve so as to cause an axially facing and radially outwardly extending shoulder to be defined at the junction of said sleeve and said stud, a mounting flange having an internally threaded bore receiving said stud and having an axially facing end disposed in face-to-face relation with said shoulder, a plurality of holes formed through said mounting flange and located in predetermined angular positions in said flange, said holes being adapted to receive fasteners for holding said nut against rotation, groove means formed in said one end of said flange, and resiliently compressible ring-like means located in said groove means and engageable with said shoulder when said flange is tightened on said stud, said ring-like means compressing axially during said tightening so as to permit said flange to be turned to an angular position establishing a predetermined angular relationship between the holes in said flange and the holes in said sleeve, said ring-like means tending to resiliently expand axially after being compressed so as to force said flange away from said sleeve and thereby press the threads in said flange into axial engagement with the threads on said stud, said ring-like means comprising a series of angularly spaced and arcuate segments located in said groove.

* * * * *